Figure 1:
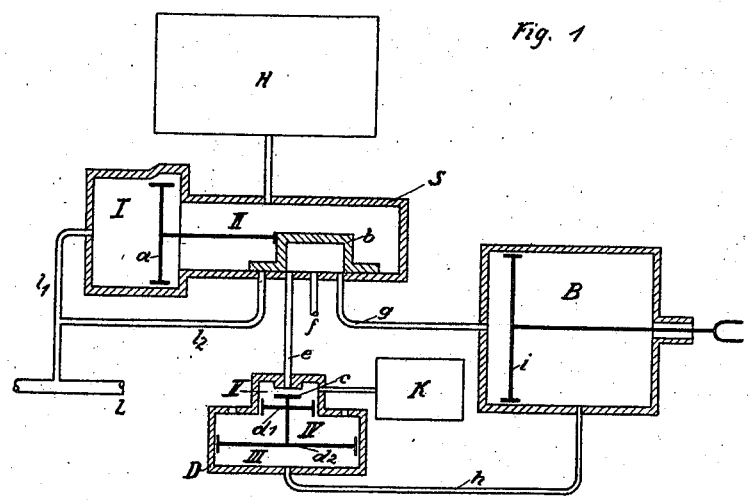

July 17, 1923.

W. HILDEBRAND

BRAKE ACCELERATOR

Filed July 21, 1920

1,461,846

Patented July 17, 1923.

1,461,846

UNITED STATES PATENT OFFICE.

WILHELM HILDEBRAND, OF LICHTENBERG, BERLIN, GERMANY, ASSIGNOR TO KNORR-BREMSE AKTIENGESELLSCHAFT, OF LICHTENBERG, BERLIN, GERMANY.

BRAKE ACCELERATOR.

Application filed July 21, 1920. Serial No. 398,039.

*To all whom it may concern:*

Be it known that I, WILHELM HILDE-BRAND, a citizen of the German Republic, residing at Neue Bahnhofstrasse 9–17, Lichtenberg, Berlin, Germany, have invented certain new and useful Improvements in Brake Accelerators (for which I have received patents as follows: Germany, No. 294,859, dated 18th December, 1915; Austria, No. 76,990, 12th December, 1916; Hungary, No. 72,329, 13th December, 1916; Sweden, No. 44,065, dated 14th December, 1916; Switzerland, No. 75,610, dated 12th December, 1916; and Finland, No. 7,806, dated 21st June, 1919), of which the following is a specification.

In brake accelerators as hitherto constructed by which on the initiation of an application of the brakes air from the train pipe is caused to pass into a transfer chamber, the pressure in this latter is relieved immediately the triple valve or brake accelerator returns to the "brake off" position, or position of rest. The chamber can then be filled with air again, immediately the triple valve is again brought into the "brake on" position, and also when the brake has not been previously quite taken off. On the one hand this causes far too great a volume of air to be consumed, and on the other hand the stages of the application of the brake, corresponding to the greater drop in the pressure in the train pipe, are too great. This becomes specially manifest in such brakes in which it is possible to take the brake partially off by any of the well known means, as at every increase in the action of the brake, which is preceded by a partial taking off of the brake, the renewed action of the transfer chambers is too great.

This disadvantage is obviated according to the present invention by controlling the connection of the train pipe with the transfer chamber by a valve which is acted upon by the pressure in the brake cylinder, and which is only opened again when the action of the brake cylinder ceases, and therefore after the brake has been completely taken off.

A diagrammatic view of a constructional example designed for a single chamber brake is shown in the drawing, in which:—

Figure 1 shows the brake in the "brake off" position and

Figure 2:
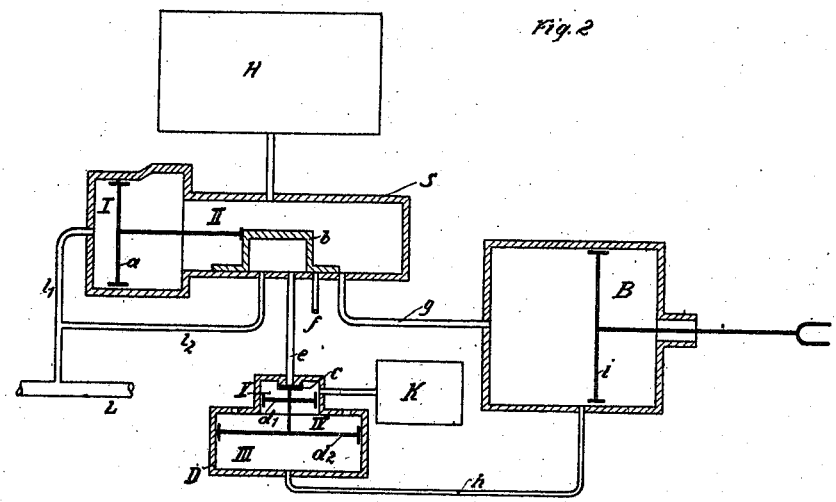

Figure 2 the same in the "brake on" position.

The compressed air admitted to the train pipe L passes therefrom through the branch pipe $l^1$ into the chamber I of the triple valve S, and forces the piston $a$ together with the slide valve $b$ into the extreme right hand position, then passes on through the groove made in the usual way into the chamber II and the auxiliary air reservoir H connected therewith. The brake cylinder B is connected to the triple valve by the pipe $g$ and this latter communicates, in the position shown in Figure 1, through the recess in the slide valve $b$ with the pipe $f$ leading to the outer air. In the same way the chamber V of the emergency apparatus (together with the transfer chamber K connected thereto) is also put into communication with the pipe $f$ through the pipe $e$ and the recess in the slide valve. The emergency apparatus D contains the emergency valve $c$, and also the differential piston $d^1$, $d^2$ connected thereto. This latter divides the casing of the emergency device into the chambers III, IV and V. The chamber III is connected by the pipe $h$ with the brake cylinder, the chamber IV with the outer air by the passages made in the casing, and the chamber V as has already been stated above, with the transfer chamber K. The piston $i$ of the brake cylinder is connected in the well known way with the brake gear of the vehicle.

When an application of the brakes is initiated by letting air escape from the continuous brake or train pipe L, the pressure in the chamber I of the triple valve decreases, so that the piston $a$ together with the slide valve $b$ can move over into the "brake on" position shown in Figure 2. In this position the branch pipe $l^2$ leading from the brake or train pipe L is connected by the recess in the slide valve $b$ to the pipe $e$, the chamber V and the chamber K. Consequently the air from the train pipe at once fills the chamber K, whereby the transmission of the action of the brake to the following brake devices is accelerated in the well known way. At the same time compressed air passes out of the auxiliary air reservoir H into the pipe $g$ which was previously covered by the slide valve $b$, fills the brake cylinder B and drives the piston $i$ towards the right. When this takes place the pipe $h$ leading to the chamber III is exposed, so that the compressed air passing into the brake cylinder, also passes under the piston $d^2$. Immediately the pressure has risen sufficiently in the chamber III, the differential piston $d^1$, $d^2$ becomes raised and closes the valve $c$, as shown in Figure 2. As the area of the piston $d^2$ is a multiple of the area of the piston $d^1$, the differential piston $d^1$, $d^2$ and consequently also the valve $c$ will remain in the position shown in Figure 2, so long as the piston of the brake cylinder $i$ remains in the "brake on" position, and therefore also so long as the brakes are not entirely taken off. It is at the same time convenient, but not essential, that the admission of air to the branch pipe $h$ should be controlled by the piston $i$. If the dimensions of the differential piston $d^1$ $d^2$ are correct it also suffices for the pipe $h$ to communicate direct with the pipe $g$. The equalization between the air pressure in the brake or train pipe L and the transfer chamber K takes place very rapidly, whereas the pressure in the brake cylinder increases comparatively slowly.

If the brake cylinder and the pipe $e$ be completely emptied of air, the air also escapes out of the pipe $h$ and the chamber III. The compressed air still enclosed in the chamber K then forces the piston $d^1$ downwards and opens the valve $c$, so that the chamber K is now also completely emptied of air through the pipes $e$ and $f$.

In the same way the apparatus may also be employed for other brakes, particularly for two-chamber compressed air brakes or for vacuum brakes. In such cases it is only necessary that the difference of pressure required for the action of the brake in two-chamber compressed air brakes or vacuum brakes should be suitably employed for closing the emergency valve.

What I claim and desire to secure by Letters Patent of the United States is:—

1. In a brake accelerator, a transfer chamber to receive air from the train pipe when an application of the brake is initiated, a brake cylinder, a de-aerating pipe normally in connection with said transfer chamber and with said brake cylinder, means for cutting off said connection with said de-aerating pipe, and a valve for controlling the connection of the train pipe with said transfer chamber, said valve being in turn controlled by fluid under pressure flowing directly from said brake cylinder.

2. In a brake accelerating apparatus for trains of vehicles, a train pipe, an expansion chamber, an outlet pipe communicating with said chamber and normally open to the atmosphere, air connections between said train pipe and said chamber, a slide valve actuated by air pressure and adapted in one position thereof to open said outlet pipe and close said air connections, and in another position thereof to close said outlet pipe and open said air connections, and a duplex piston also actuated by air pressure and adapted to open and close said air connections.

WILHELM HILDEBRAND.